United States Patent Office 2,728,797
Patented Dec. 27, 1955

2,728,797

PRODUCTION OF CRESOL

Leo J. Filar, Wilmington, Del., assignor to Hercules Powder Company, Wilmington, Del., a corporation of Delaware No Drawing. Application June 10, 1954,
Serial No. 435,942

10 Claims. (Cl. 260—621)

This invention relates to the production of cresol from an air oxidized cymene and more particularly it relates to the treatment of the oxidized cymene containing hydroperoxides prior to cleavage of the hydroperoxides to the desired cresol.

In the oxidation of m- or p-cymene to the corresponding hydroperoxides the main product is an 8-hydroperoxycymene and in those processes which give a high conversion in the oxidation, a minor product is 7-hydroperoxycymene. When such an oxidation product containing 7-hydroperoxycymene as an impurity is subjected to phenolic cleavage for the production of cresol, the 7-hydroperoxycymene breaks down into formaldehyde and isopropyl phenol. The formaldehyde produced causes resinification of the cresol, thereby reducing the yield of cresol by an amount far in excess of the molecular amount of formaldehyde produced, and the isopropyl phenol produced contaminates the cresol and complicates its purification.

Now in accordance with the present invention it has been found that a cymene oxidate containing an 8-hydroperoxycymene as the major hydroperoxide component and a 7-hydroperoxycymene as the minor component is converted in improved yields into cresol substantially free of isopropyl phenol by heating the oxidate in a homogeneous solution with a catalytic amount, in the range of 0.5% to 2.0% of the hydroperoxide content of the oxidate, of a compound of a metal of the group consisting of hydroxides of sodium, potassium, calcium and barium, and the oxides, hydroxides and salts of the heavy metals at a temperature in the range of about 0° C. to about 50° C. until the total hydroperoxide content is reduced by an amount in the range of 0.75 to 1.25 times the amount of 7-hydroperoxycymene in the oxidate and subsequently contacting the treated cymene oxidate with an acidic hydroperoxide cleavage catalyst until the remaining hydroperoxide contained therein is substantially completely converted to the corresponding phenol.

The process of this invention is more particularly described with respect to the following examples wherein all parts and percentages are by weight.

Example 1

Four thousand four hundred sixty parts p-cymene which had been oxidized by contacting with air at 115° C. in the presence of aqueous sodium carbonate solution contained approximately 15.8% total hydroperoxides. The unreacted p-cymene was stripped from this oxidate under reduced pressure and the residue amounting to 792 parts containing 80.0% 8-hydroperoxy-p-cymene and 9.2% 7-hydroperoxy-p-cymene was recovered. Part of this concentrated oxidate amounting to 344.5 parts was dissolved in 448.4 parts of petroleum ether and to this mixture was gradually added over a 40-minute period 43.8 parts of a 10% solution of potassium hydroxide in isopropyl alcohol. The initial temperature was 21° C. and the final temperature was 31° C. due to the heat of reaction. The resulting mixture was cooled to 0° C. at which temperature it was maintained for 15 hours. The reaction was then stopped by the addition of 150 parts of water. After separation of the water layer, the reaction mixture was washed again with 150 parts of water. The solvent was stripped off at reduced pressure to obtain a residue amounting to 336 parts which analyzed 79.3% 8-hydroperoxy-p-cymene 2.9% 7-hydroperoxy-p-cymene.

One hundred eighty-three parts of this treated oxidate containing 145 parts 8-hydroperoxy-p-cymene was added to a mixture of 0.3 part concentrated sulfuric acid in 52 parts of acetone while heating at about 55° C. to 75° C. This caused cleavage of the hydroperoxide to p-cresol which was recovered by distillation. The yield of p-cresol fraction free of isopropyl phenol amounted to 82 parts. When a sample of concentrated oxidate amounting to 181 parts and containing 145 parts 8-hydroperoxy-p-cymene was subjected to cleavage under the same conditions without a previous treatment with potassium hydroxide to decompose the 7-hydroperoxy-p-cymene, the yield of p-cresol freed from isopropyl phenol by distillation amounted to only 73 parts.

Example 2

When Example 1 was repeated using a m-cymene oxidate for the production of m-cresol, a corresponding increase in yield of m-cresol was obtained as a result of the decomposition of 7-hydroperoxy-m-cymene by the treatment with potassium hydroxide.

Example 3

Eighty parts of a p-cymene oxidate obtained by oxidizing p-cymene with air under mildly alkaline conditions contained 29.7% 8-hydroperoxy-p-cymene and 3.1% 7-hydroperoxy-p-cymene. This oxidate was treated with 10 parts of a 10% solution of potassium hydroxide in isopropyl alcohol. The temperature rose to about 30° C., which temperature was maintained for 2 hours. The reaction mixture was then washed with 2 volumes of water. After drying the resulting product analyzed 28.9% 8-hydroperoxy-p-cymene and 0.1% 7-hydroperoxy-p-cymene. A sample of this treated oxidate gave 0.48 part p-cresol per part p-cymene oxidized in the initial step while an untreated sample of oxidate gave only 0.43 part of p-cresol per part of p-cymene oxidized in the initial step.

Example 4

When Example 3 was repeated using a 10% solution of sodium hydroxide in ethyl alcohol in place of the 10% solution of potassium hydroxide in isopropyl alcohol, the 7-hydroperoxy-p-cymene contained was reduced to 0.3% and the yield of p-cresol was 0.47 part per part of cymene oxidized in the initial step.

Example 5

When 0.5 part of pulverized sodium hydroxide was substituted for the 10% solution of sodium hydroxide in ethanol in Example 4, the sodium hydroxide reacted with the hydroperoxides and dissolved substantially completely. After 1½ hours at 30° C. the decomposition reaction mixture was washed with water and dried. The recovered oxidate contained 27.5% 8-hydroperoxy-p-cymene and no detectable amount of 7-hydroperoxy-p-cymene. This treated oxidate on cleavage yielded 0.47 part p-cresol per part of cymene oxidized in the initial step.

Example 6

Substantially similar results were obtained when pulverized fresh anhydrous barium hydroxide was substituted for sodium hydroxide in Example 5.

Example 7

A p-cymene oxidate containing 64.8% 8-hydroperoxy-p-cymene and 7.2% 7-hydroperoxy-p-cymene was mixed with 2.4 parts zinc cumate per 100 parts oxidate and allowed to stand for about 10 days at 20–30° C. At the end of this time the zinc salt was removed by washing with 5% aqueous acetic acid solution and then with water. The resulting oxidate after having been dried was found to contain 64.6% 8-hydroperoxy-p-cymene and 2.7% 7-hydroperoxy-p-cymene. A sample of this treated oxidate when subjected to phenolic cleavage yielded 87% of the theoretical amount of p-cresol, while a portion of the untreated oxidate subjected to a similar phenolic cleavage gave only 80% of the theoretical yield of p-cresol based on the 8-hydroperoxy-p-cymene.

The process of this invention is applicable to o-, m- and p-isomers, but is of particularly greater importance in the case of the m- and p-isomers, since these isomers of cymene more readily give a cymene oxidate to which the process can be applied for the production of the corresponding cresol.

The cymene oxidate can be prepared by any of the well-known processes of oxidizing cymene to the hydroperoxide. However, in order to assure an optimum yield of oxidate a process using a mild alkali in non-aqueous systems or using an aqueous alkali should be used. The process of U. S. 2,632,774, for instance, gives a good yield of cymene hydroperoxide without appreciable amounts of carbinols and ketones such as result when concentrated solutions of strong alkalies are used in the oxidation process. The advantages of the present invention are more pronounced in showing an overall improvement when combined with such an oxidation process which gives high yields of hydroperoxide and low yields of such breakdown products as alcohols and ketones.

The cymene oxidate may be treated by the process of this invention without concentration or part or all of the excess cymene may first be removed by distillation.

The process of the present invention involves selective destruction of the 7-hydroperoxycymene prior to subjecting the oxidate to cleavage. The catalyst used for the selective destruction of the 7-hydroperoxycymene is an alkali such as the hydroxide of sodium, potassium, calcium or barium, or a heavy metal oxide, hydroxide or salt, preferably an organic salt, of the heavy metal. By the term "heavy metal" is meant a metal having a density greater than four and an atomic weight greater than forty and therefore of low atomic volume. This group includes the drier metals manganese, lead, zinc, copper, cobalt, iron, nickel, molybdenum, vanadium, silver, chromium and mercury which are metals having drier properties in the drying of oil, and which comprise a preferred group of catalytically acting heavy metals which catalyze the decomposition of the primary hydroperoxides selectively. The remaining heavy metals are selectively effective but act more slowly in the decomposition process. Organic salts of the heavy metals which are used as catalysts include salts of higher fatty acids, cumic acid, resin acids, and the like. The particular salt used is selected largely on the basis of solubility in organic solvents for any particular metal catalyst.

The amount of metal catalyst used should be only a catalytic amount preferably in the range of 0.5 to 2.0% of the amount of hydroperoxide in the oxidate.

Since the reaction is a selective reaction for decomposition of 7-hydroperoxycymene, in which the 8-hydroperoxycymene will also be decomposed if the process is not carefully controlled, the conditions of time and temperature are somewhat critical. The reaction is exothermic and rapid in the range of 0–50° C. with complete destruction of the 7-hydroperoxycymene in a very short time. Temperatures above 50° C. are neither necessary nor desirable. Moreover, the reaction is controlled carefully so that decomposition at the expense of the 8-hydroperoxycymene does not continue after all of the 7-hydroperoxycymene is all decomposed. Since the two hydroperoxides have different rates of decomposition the reaction is continued only to the extent that the desired improvement is effected. Thus the reaction is continued until the total hydroperoxycymene in the oxidate decomposed is equal to at least about 0.75 but not in excess of 1.25 times the amount of 7-hydroperoxycymene in the oxidate. By controlling the process in this fashion the optimum yields are obtained. If less hydroperoxide is destroyed by the process of this invention, the yield of cresol will be reduced by the resinification reaction with formaldehyde in the subsequent cleavage reaction. If more hydroperoxide is destroyed, all of the 7-hydroperoxycymene will be destroyed and no resinification will take place, but the 8-hydroperoxycymene is also needlessly destroyed and the overall yield of cresol produced will be correspondingly lowered. Since one mole of formaldehyde will combine with two moles of cresol, it is preferable to carry out the decomposition to an extent corresponding to at least complete decomposition of all of the 7-hydroperoxycymene in the oxidate.

The decomposition reaction mixture must be substantially anhydrous and homogeneous to produce the optimum benefits of the present process. To this end, alcohols may be added to promote homogeneity. Other solvents such as hydrocarbons, e. g., hexane or benzene may be used if desired to control the extent of the decomposition.

After the decomposition reaction has been allowed to continue to the extent of selective decomposition of the 7-hydroperoxycymene, the reaction is stopped either by dilution with sufficient water to form two phases followed by washing, or by addition of an amount of mineral acid equivalent to the metal of the catalyst. In the latter instance, the reaction mixture does not need to be washed, but may be subjected directly to cleavage. In the acidification to neutralize the metal catalyst, a suitable procedure is to add a sufficient excess of the mineral acid to act as the cleavage catalyst.

The cleavage reaction is not particularly critical. Any of the well-known cleavage processes that give a good yield of phenolic material are satisfactory. The processes of U. S. 2,663,735 for instance is satisfactory. This process uses sulfuric acid as the catalyst. Other catalysts which are also acceptable hydroperoxide cleavage catalysts are: hydrochloric acid, zinc chloride, aluminum chloride, phosphoric acid and various acid clays, all of which are commercially practical, and other mineral acids and Friedel-Crafts type of catalysts which are less useful commercially. These acidic or acid-acting materials are now known as hydroperoxide cleavage catalysts.

The cleavage reaction can be carried out in aqueous two phase systems or in organic solvents such as acetone or alcohol which form a homogeneous one phase system. Acetone is a preferred solvent for the homogeneous system.

The cleavage reaction is continued until the hydroperoxide is completely cleaved and the cresol is then recovered.

Since the 7-hydroperoxycymene is substantially completely destroyed prior to the cleavage reaction, neither formaldehyde nor isopropyl phenol is produced in significant amounts in the cleavage step. The yeld of desired cresol is thus greatly improved. Moreover, since isopropyl phenol is not produced, the cresol is obtained in a much purer state by the process of this invention. The cresol can be recovered in a pure state by distillation.

What I claim and desire to protect by Letters Patent is:

1. A method for converting a cymene oxidate containing an 8-hydroperoxycymene as the major hydroperoxide component and a 7-hydroperoxycymene as the minor hydroperoxide component into a cresol substantially free of isopropyl phenol, which comprises contacting the oxidate in homogeneous nonaqueous solution with a catalytic amount, in the range of 0.5% to 2% of the hydroperoxide content of the oxidate, of a metal compound of the group consisting of hydroxides of sodium, potassium, calcium and barium, and hydroxides, oxides and organic acid salts of heavy metals at a temperature in the range of about 0° C. to about 50° C. until the total hydroperoxide content is reduced by an amount in the range of 0.75 to about 1.25 of the amount of 7-hydroperoxycymene in the oxidate, and subsequently contacting the treated cymene oxidate with an acidic hydroperoxide cleavage catalyst until the remaining hydroperoxide contained therein is substantially completely converted to the cresol.

2. A method for converting a cymene oxidate containing an 8-hydroperoxycymene as the major hydroperoxide component and a 7-hydroperoxycymene as the minor hydroperoxide component into a cresol substantially free of isopropyl phenol, which comprises contacting the oxidate in homogeneous nonaqueous solution with a catalystic amount, in the range of 0.5% to 2% of the hydroperoxide content of the oxidate, of sodium hydroxide at a temperature in the range of about 0° C. to about 50° C. until the total hydroperoxide content is reduced by an amount in the range of 0.75 to about 1.25 of the amount of 7-hydroperoxycymene in the oxidate, and subsequently contacting the treated cymene oxidate with an acidic hydroperoxide cleavage catalyst until the remaining hydroperoxide contained therein is substantially completely converted to the cresol.

3. A method for converting a cymene oxidate containing an 8-hydroperoxycymene as the major hydroperoxide component and a 7-hydroperoxycymene as the minor hydroperoxide component into a cresol substantially free of isopropyl phenol, which comprises contacting the oxidate in homogeneous nonaqueous solution with a catalytic amount, in the range of 0.5% to 2% of the hydroperoxide content of the oxidate, of potassium hydroxide at a temperature in the range of about 0° C. to about 50° C. until the total hydroperoxide content is reduced by an amount in the range of 0.75 to about 1.25 of the amount of 7-hydroperoxycymene in the oxidate, and subsequently contacting the treated cymene oxidate with an acidic hydroperoxide cleavage catalyst until the remaining hydroperoxide contained therein is substantially completely converted to the cresol.

4. A method for converting a m-cymene oxidate containing an 8-hydroperoxy-m-cymene as the major hydroperoxide component and a 7-hydroperoxy-m-cymene as the minor hydroperoxide component into m-cresol substantially free of isopropyl phenol, which comprises contacting the oxidates in homogeneous nonaqueous solution with a catalytic amount, in the range of 0.5% to 2% of the hydroperoxide content of the oxidate, of a compound of a metal of the group consisting of hydroxides of sodium, potassium, calcium and barium, and the hydroxides, oxides and organic acid salts of heavy metals at a temperature in the range of about 0° C. to about 50° C. until the total hydroperoxide content is reduced by an amount in the range of 0.75 to about 1.25 of the amount of 7-hydroperoxy-m-cymene in the oxidate, and subsequently contacting the treated cymene oxidate with an acidic hydroperoxide cleavage catalyst until the remaining hydroperoxide contained therein is substantially completely converted to m-cresol.

5. A method for converting a p-cymene oxidate containing an 8-hydroperoxy-p-cymene as the major hydroperoxide component and a 7-hydroperoxy-p-cymene as the minor hydroperoxide component into p-cresol substantially free of isopropyl phenol, which comprises contacting the oxidate in homogeneous nonaqueous solution with a catalytic amount in the range of 0.5% to 2% of the hydroperoxide content of the oxidate of a compound of a metal of the group consisting of hydroxides of sodium, potassium, calcium and barium, and the hydroxides, oxides and organic acid salts of the heavy metals at a temperature in the range of about 0° C. to about 50° C. until the total hydroperoxide content is reduced by an amount in the range of 0.75 to about 1.25 of the amount of 7-hydroperoxy-p-cymene in the oxidate, and subsequently contacting the treated cymene oxidate with an acidic hydroperoxide cleavage catalyst until the remaining hydroperoxide contained therein is substantially completely converted to p-cresol.

6. A method for converting a cymene oxidate containing an 8-hydroperoxycymene as the major hydroperoxide component and a 7-hydroperoxycymene as the minor hydroperoxide component into a cresol substantially free of isopropyl phenol, which comprises contacting the oxidate in homogeneous nonaqueous solution with a catalytic amount, in the range of 0.5% to 2% of the hydroperoxide content of the oxidate, of a compound of a metal of the group consisting of hydroxides of sodium, potassium, calcium and barium, and the hydroxides, oxides and organic acid salts of the heavy metals at a temperature in the range of about 0 C. to about 50° C. until the total hydroperoxide content is reduced by an amount in the range of 0.75 to about 1.25 of the amount of 7-hydroperoxycymene in the oxidate, removing said catalyst, and subsequently contacting the treated cymene oxidate with an acidic hydroperoxide cleavage catalyst until the remaining hydroperoxide contained therein is substantially completely converted to the cresol.

7. A method for converting a cymene oxidate containing an 8-hydroperoxycymene as the major hydroperoxide component and a 7-hydroperoxycymene as the minor hydroperoxide component into a cresol substantially free of isopropyl phenol, which comprises contacting the oxidate in homogeneous nonaqueous solution with a catalytic amount, in the range of 0.5% to 2% of the hydroperoxide content of the oxidate, of a compound of a metal of the group consisting of hydroxides of sodium, potassium, calcium and barium, and the hydroxides, oxides and organic acid salts of the heavy metals at a temperature in the range of about 0° C. to about 50° C. until the total hydroperoxide content is reduced by an amount in the range of 0.75 to about 1.25 of the amount of 7-hydroperoxycymene in the oxidate, neutralizing said catalyst with a mineral acid and subsequently contacting the treated cymene oxidate with an acidic hydroperoxide cleavage catalyst until the remaining hydroperoxide contained therein is substantially completely converted to the cresol.

8. A method for converting a cymene oxidate containing an 8-hydroperoxycymene as the major hydroperoxide component and a 7-hydroperoxycymene as the minor hydroperoxide component into a cresol substantially free of isopropyl phenol, which comprises contacting the oxidate in homogeneous nonaqueous solution with a catalytic amount, in the range of 0.5% to 2% of the hydroperoxide content of the oxidate, of a compound of a metal of the group consisting of hydroxides of sodium, potassium, calcium and barium, and the hydroxides, oxides and organic acid salts of the heavy metals at a temperature in the range of about 0° C. to about 50° C. until the total hydroperoxide content is reduced by an amount in the range of 0.75 to about 1.25 of the amount of 7-hydroperoxycymene in the oxidate, removing said catalyst by washing with water and subsequently contacting the treated cymene oxidate with an acidic hydroperoxide cleavage catalyst until the remaining hydroperoxide contained therein is substantially completely converted to the cresol.

9. A method for converting a cymene oxidate containing an 8-hydroperoxycymene as the major hydroperoxide component and a 7-hydroperoxycymene as the minor hydroperoxide component into a cresol substantially free of isopropyl phenol, which comprises contacting the oxidate in homogeneous nonaqueous solution with a catalytic amount, in the range of 0.5% to 2% of the hydroperoxide content of the oxidate, of calcium hydroxide at a temperature in the range of about 0° C. to about 50° C. until the total hydroperoxide content is reduced by an amount in the range of 0.75 to about 1.25 of the amount of 7-hydroperoxycymene in the oxidate, and subsequently contacting the treated cymene oxidate with an acidic hydroperoxide cleavage catalyst until the remaining hydroperoxide contained therein is substantially completely converted to the cresol.

10. A method for converting a cymene oxidate containing an 8-hydroperoxycymene as the major hydroperoxide component and a 7-hydroperoxycymene as the minor hydroperoxide component into a cresol substantially free of isopropyl phenol, which comprises contacting the oxidate in homogeneous nonaqueous solution with a catalytic amount, in the range of 0.5% to 2% of the hydroperoxide content of the oxidate, of barium hydroxide at a temperature in the range of about 0° C. to about 50° C. until the total hydroperoxide content is reduced by an amount in the range of 0.75 to about 1.25 of the amount of 7-hydroperoxycymene in the oxidate, and subsequently contacting the treated cymene oxidate with an acidic hydroperoxide cleavage catalyst until the remaining hydroperoxide contained therein is substantially completely converted to the cresol.

References Cited in the file of this patent
UNITED STATES PATENTS 2,683,751    Filar _____ July 13, 1954